United States Patent
Wu et al.

(10) Patent No.: US 11,245,435 B2
(45) Date of Patent: Feb. 8, 2022

(54) ECHO CANCELLATION CIRCUIT

(71) Applicant: REALTEK SEMICONDUCTOR CORPORATION, Hsinchu (TW)

(72) Inventors: Chien-Ming Wu, Hsinchu County (TW); Chia-Lin Chang, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/993,312

(22) Filed: Aug. 14, 2020

(65) Prior Publication Data

US 2021/0152213 A1 May 20, 2021

(30) Foreign Application Priority Data

Nov. 19, 2019 (TW) .................. 108141998

(51) Int. Cl.
*H04B 3/20* (2006.01)
*H04B 3/23* (2006.01)

(52) U.S. Cl.
CPC ..................... *H04B 3/23* (2013.01)

(58) Field of Classification Search
CPC ........... H04B 3/23; H04B 3/20; H04M 3/002; H04M 9/082; H04M 7/006
See application file for complete search history.

(56) References Cited

U.S. PATENT DOCUMENTS

| 7,304,961 | B2 * | 12/2007 | Huang | H04B 3/23 370/286 |
| 7,778,209 | B2 * | 8/2010 | Lin | H04B 3/03 370/286 |
| 8,537,728 | B2 * | 9/2013 | Huang | H04B 3/23 370/286 |
| 8,670,555 | B2 * | 3/2014 | Huang | H04B 3/238 379/406.1 |
| 2002/0119753 | A1 * | 8/2002 | Digiandomenico | H04B 3/23 455/570 |
| 2005/0152262 | A1 * | 7/2005 | Huang | H04B 3/23 370/201 |
| 2009/0067616 | A1 * | 3/2009 | Suhre | H03K 3/037 379/406.06 |
| 2021/0218497 | A1 * | 7/2021 | Huang | H04L 1/0021 |

OTHER PUBLICATIONS

Ramin Farjad et al., "A 48-Port FCC-Compliant 10GBASE-T Transmitter With Mixed-Mode Adaptive Echo Canceller", Dec. 2012, vol. 47, No. 12, IEEE Journal of Solid-State Circuits.

* cited by examiner

*Primary Examiner* — Phuongchau Ba Nguyen
(74) *Attorney, Agent, or Firm* — WPAT, PC (57) ABSTRACT

An echo cancellation circuit is coupled to a receiving circuit and a transmitting circuit of an electronic device, and the transmitting circuit includes an output transistor. The echo cancellation circuit includes first and second transistors, first and second resistor-capacitor networks (RC networks), and first and second resistors. The first transistor has a first gate, a first drain and a first source. The second transistor has a second gate, a second drain and a second source. The first drain and the second drain are coupled to the receiving circuit. The first RC network is coupled between the gate of the output transistor and the first gate. The second RC network is coupled between the first gate and the second gate. The first resistor is coupled between the first source and a reference voltage. The second resistor is coupled between the second source and the reference voltage.

9 Claims, 6 Drawing Sheets

ECHO CANCELLATION CIRCUIT

BACKGROUND OF THE INVENTION

1. Field of the Invention

The present invention generally relates to electronic devices, and, more particularly, to the echo cancellation circuit of electronic devices.

2. Description of Related Art

Figure 1:
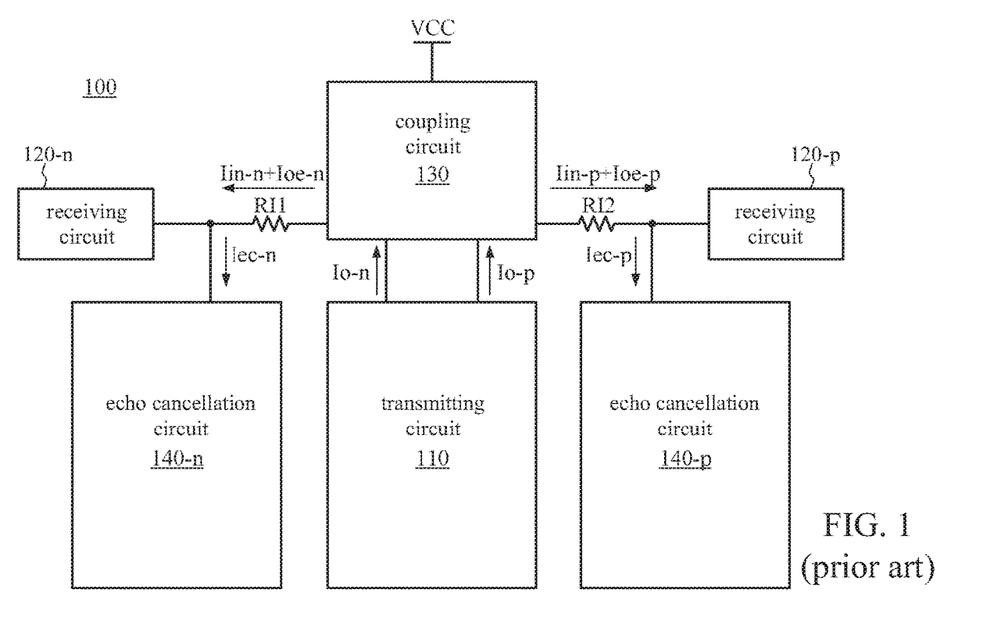
FIG. 1 is a functional block diagram of an electronic device which includes an echo cancellation circuit.

As signals are usually reflected from the transmitting end of an electronic circuit to the receiving end of that same circuit, the echo cancellation technique, which is aimed to cancel the reflected signals (i.e., echoes), is widely used in electronic circuits in a manner that avoids interferences at the receiving end caused by the reflected signals. FIG. 1 is a functional block diagram of an electronic device which includes an echo cancellation circuit. The electronic device 100 includes a transmitting circuit 110, a receiving circuit 120 (which includes 120-p and 120-n), a coupling circuit 130, and an echo cancellation circuit 140 (which includes 140-p and 140-n). The output signal Io (which includes the differential output signal Io-p and Io-n) generated by the transmitting circuit 110 is outputted to another electronic device or circuit (not shown) through the coupling circuit 130, and the receiving circuit 120 receives the input signal Iin (which includes the differential input signal Iin-p and Iin-n) through the coupling circuit 130. However, in addition to the input signal Iin, the receiving circuit 120 is likely to receive the echo Ioe (which includes the echoes Ioe-p and Ioe-n) caused by the output signal Io. As illustrated in FIG. 1, the signal passing the input resistor RI1 includes the input signal Iin-n and the echo Ioe-n, and the signal passing the input resistor RI2 includes the input signal Iin-p and the echo Ioe-p).

A widely used technique to cancel the echo is to create an echo cancellation signal in the circuit to cancel the echo at the receiving end. The better the echo cancellation signal Iec (which includes Iec-p and Iec-n) generated by the echo cancellation circuit 140 resembles the echo Ioe, the better the effect of echo cancellation, which leads to less echo received by the receiving circuit 120. For more details about echo cancellation, please refer to Ramin Farjad, Friedel Gerfers, Michael Brown, Ahmad R. Tavakoli, David Nguyen, Hossein Sedarat, Ramin Shirani, Hiok-Tiaq Ng, "A 48-Port FCC-Compliant 10GBASE-T Transmitter with Mixed-Mode Adaptive Echo Canceller," *IEEE Journal of Solid-State Circuits*, 2012.

However, because the load and operating frequency of a circuit differ from applications to applications, and the echo Ioe is highly dependent on the load and operating frequency, the echo cancellation circuit 140, which fails to adjust the echo cancellation signal Iec according to various applications, has limited echo cancellation capabilities, and thus can hardly contribute to the performance of the circuit in some applications.

SUMMARY OF THE INVENTION

In view of the issues of the prior art, an object of the present invention is to provide a distributed echo cancellation circuit which is flexible in cancelling echoes for various applications, so as to make an improvement to the prior art.

An echo cancellation circuit is provided. The echo cancellation circuit is coupled to a transmitting circuit and a receiving circuit of an electronic device. The transmitting circuit includes an output transistor. The echo cancellation circuit includes a first transistor, a second transistor, a first resistor-capacitor network (RC network), a second RC network, a first resistor and a second resistor. The first transistor has a first gate, a first drain and a first source. The first drain is coupled to the receiving circuit. The second transistor has a second gate, a second drain and a second source. The second drain is coupled to the receiving circuit. The first RC network is coupled between a gate of the output transistor and the first gate. The second RC network is coupled between the first gate and the second gate. An end of the first resistor is coupled to the first source and the other end of the first resistor is coupled to a reference voltage. An end of the second resistor is coupled to the second source and the other end of the second resistor is coupled to the reference voltage.

An echo cancellation circuit is provided. The echo cancellation circuit is coupled to a transmitting circuit and a receiving circuit of an electronic device. The transmitting circuit includes an output transistor. The echo cancellation circuit includes a first transistor, a second transistor, a first resistor-capacitor network (RC network), a second RC network, a first resistor and a second resistor. The first transistor has a first gate, a first drain and a first source. The first drain is coupled to the receiving circuit. The second transistor has a second gate, a second drain and a second source. The second drain is coupled to the receiving circuit. The first RC network is coupled between a gate of the output transistor and the first gate. The second RC network is coupled between the gate of the output transistor and the second gate. An end of the first resistor is coupled to the first source and the other end of the first resistor is coupled to a reference voltage. An end of the second resistor is coupled to the second source and the other end of the second resistor is coupled to the reference voltage.

An echo cancellation circuit is provided. The echo cancellation circuit is coupled to a transmitting circuit and a receiving circuit of an electronic device. The transmitting circuit includes an output transistor. The echo cancellation circuit includes a first transistor, a second transistor, a first resistor-capacitor network (RC network), a second RC network, third RC network, a first resistor and a second resistor. The first transistor has a first gate, a first drain and a first source. The first drain is coupled to the receiving circuit. The second transistor has a second gate, a second drain and a second source. The second drain is coupled to the receiving circuit. The first RC network is coupled between a gate of the output transistor and the first gate. The second RC network is coupled between the first gate and the second gate. The third RC network is coupled between the gate of the output transistor and the second gate. An end of the first resistor is coupled to the first source and the other end of the first resistor is coupled to a reference voltage. An end of the second resistor is coupled to the second source and the other end of the second resistor is coupled to the reference voltage.

By using multiple echo cancellation signals to cancel the echoes at different time points, the echo cancellation circuit of the present invention is flexible in cancelling the echoes. Compared to the conventional technology, the echo cancellation circuit of the present invention has a better echo cancellation effect as it can be easily adjusted for various loads and operating frequencies.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes echo cancellation circuits. On account of that some or all elements of the echo cancellation circuits could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

In this document, the term "coupled" and the term "connected" may mean "directly coupled" and "directly connected" respectively, or "indirectly coupled" and "indirectly connected" respectively. "Coupled" and "connected" may also be used to indicate that two or more elements cooperate or interact with each other.

Although the terms "first," "second," etc., may be used herein to describe various elements, these elements should not be limited by these terms. Rather, these terms are only used to distinguish one element from another. For example, a first element could be termed a second element, and, similarly, a second element could be termed a first element, without departing from the scope of the embodiments.

Figure 2:
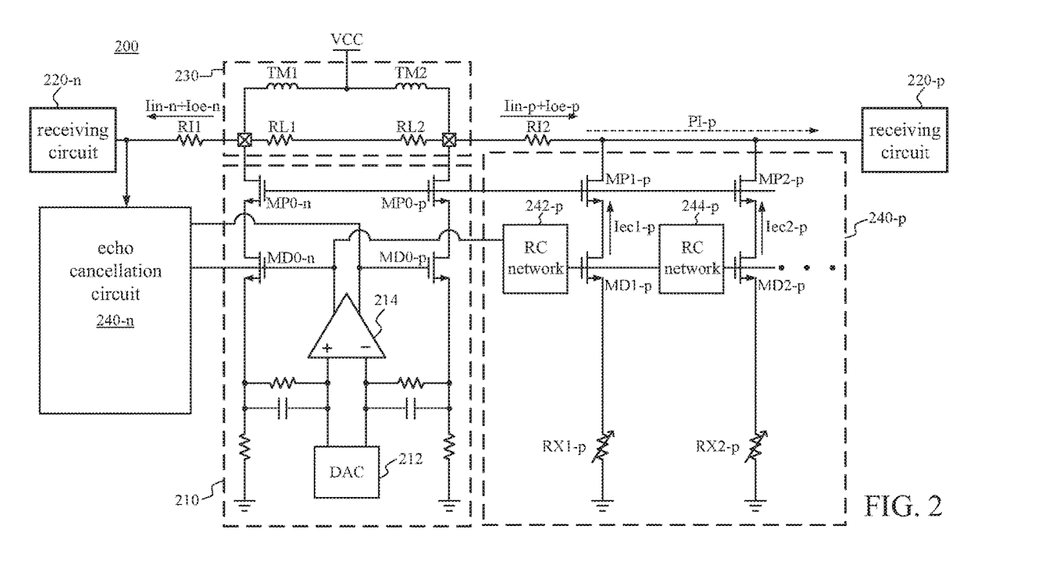
FIG. 2 is a circuit diagram of an illustrative echo cancellation circuit according to an embodiment of the present invention.

FIG. 2 shows a circuit diagram of an illustrative echo cancellation circuit according to an embodiment of the present invention. The electronic device 200 includes a transmitting circuit 210, a receiving circuit 220 (which includes 220-p and 220-n), a coupling circuit 230 and an echo cancellation circuit 240 (which includes 240-p and 240-n). The coupling circuit 230 includes a transformer TM1, a transformer TM2, a resistor RL1 and a resistor RL2. The transmitting circuit 210 includes a digital-to-analog converter (DAC) 212, an operational amplifier 214, an output transistor MD0-p, an output transistor MD0-n, a protection transistor MP0-p, a protection transistor MP0-n and several resistors and capacitors. Through the operational amplifier 214, the DAC 212 drives the output transistor MD0-p and the output transistor MD0-n to generate output currents. The protection transistor MP0-p and the protection transistor MP0-n, which are connected in series with the output transistor MD0-p and the output transistor MD0-n, respectively, are aimed to protect the output transistor MD0-p and the output transistor MD0-n from being directly subject to excessive voltages. The operation principles of the coupling circuit 230 and the transmitting circuit 210 are well-known to people having ordinary skill in the art, and shall be omitted herein. The receiving circuit 220-p and the receiving circuit 220-n respectively receive the input signal Iin-p and the input signal Iin-n through the coupling circuit 230, and the echo cancellation circuit 240-p and the echo cancellation circuit 240-n respectively cancel the echo Ioe-p and the echo Ioe-n. The receiving circuit 220 is well known to people having ordinary skill in the art, and its details are thus omitted for brevity. The internal circuit of the echo cancellation circuit 240-p is discussed below. The echo cancellation circuit 240-n is similar to the echo cancellation circuit 240-p. People having ordinary skill in the art can learn the internal circuit of the echo cancellation circuit 240-n after reading the discussions of the echo cancellation circuit 240-p, so the discussions of the echo cancellation circuit 240-n are omitted for brevity.

The echo cancellation circuit 240-p includes a transistor MD1-p, a transistor MD2-p, a transistor MP1-p, a transistor MP2-p, a resistor-capacitor network (RC network) 242-p, a RC network 244-p, a resistor RX1-p and a resistor RX2-p. It should be noted that the RC network 242-p and the RC network 244-p are coupled or electrically connected to the gate of another output transistor MD0-n (i.e., the inverting output of the operational amplifier 214), a first current Iec1-p is related to the inverting output signal of the operational amplifier 214, the RC network 242-p and the transistor MD1-p, and a second current Iec2-p is related to the inverting output signal of the operational amplifier 214, the RC network 242-p, the RC network 244-p and the transistor MD2-p. The first current Iec1-p and the second current Iec2-p are aimed to cancel the echo Ioe caused by the output signal Io. In other words, the echo cancellation circuit 240-p cancels the second component of the echo Ioe (i.e., the echo Ioe-p related to the non-inverting output signal of the operational amplifier 214) based on the first component of the differential signal (e.g., the inverting output signal of the operational amplifier 214) of the transmitting circuit 210. Similarly, the echo cancellation circuit 240-n cancels the first component of the echo Ioe (i.e., the echo Ioe-n related to the inverting output signal of the operational amplifier 214) based on the second component of the differential signal (e.g., the non-inverting output signal of the operational amplifier 214) of the transmitting circuit 210.

The drain of the transistor MD1-p is coupled to the receiving circuit 220-p through the transistor MP1-p, and the source of the transistor MD1-p is coupled to the reference voltage (e.g., ground) through the resistor RX1-p. In other words, the transistor MP1-p, the transistor MD1-p and the resistor RX1-p are connected in series. The transistor MP1-p, the transistor MD1-p and the resistor RX1-p form a first current path, through which the first current Iec1-p is drawn from the input path (i.e., the path PI-p between the input resistor RI2 and the receiving circuit 220-p). The first current Iec1-p flows through the transistor MP1-p, the transistor MD1-p and the resistor RX1-p, and the magnitude of the first current Iec1-p is inversely proportional to the resistance value of the resistor RX1-p. The gate of the transistor MP1-p is electrically connected to the gate of the protection transistor MP0-p, and the gate of the transistor MD1-p is coupled to the gate of the output transistor MD0-n through the RC network 242-p. The first current Iec1-p is a part of the echo cancellation signal that the echo cancellation circuit 240-p generates.

The drain of the transistor MD2-p is coupled to the receiving circuit 220-p through the transistor MP2-p, and the source of the transistor MD2-p is coupled to the reference voltage through the resistor RX2-p. In other words, the transistor MP2-p, the transistor MD2-p and the resistor RX2-p are connected in series. The transistor MP2-p, the transistor MD2-p and the resistor RX2-p form a second current path, through which the second current Iec2-p is drawn from the input path PI-p. The second current Iec2-p flows through the transistor MP2-p, the transistor MD2-p and the resistor RX2-p, and the magnitude of the second current Iec2-p is inversely proportional to the resistance value of the resistor RX2-p. The gate of the transistor MP2-p is electrically connected to the gate of the protection transistor MP0-p, and the gate of the transistor MD2-p is coupled to the gate of the transistor MD1-p through the RC network 244-p. The second current Iec2-p is a part of the echo cancellation signal that the echo cancellation circuit 240-p generates.

As shown in FIG. 2, because the RC network 244-p is coupled to the gate of the output transistor MD0-n through the RC network 242-p, the RC network 242-p and the RC network 244-p can be deemed serially connected.

Figure 3:
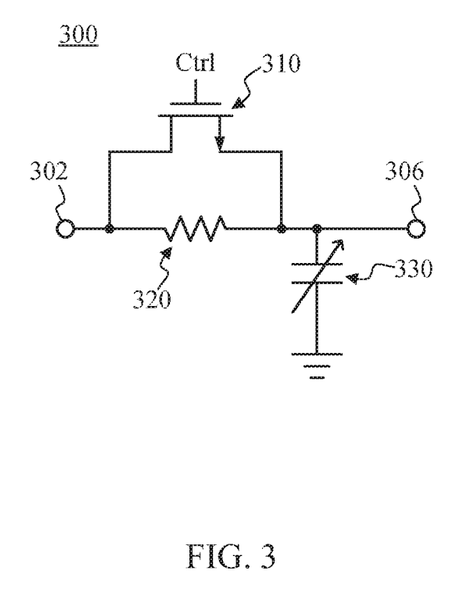
FIG. 3 is an illustrative embodiment of a resistor-capacitor network (RC network).

FIG. 3 shows an embodiment of the RC network. The RC network 300 includes a transistor 310, a resistor 320 and a capacitor 330. The source of the transistor 310 is coupled to one end of the resistor 320, the drain of the transistor 310 is coupled to the other end of the resistor 320, and the gate of the transistor 310 is controlled by the control signal Ctrl. The RC network 300 has an input terminal 302 and an output terminal 306. For the RC network 242-p, the input terminal 302 is coupled to the gate of the output transistor MD0-n, and the output terminal 306 is coupled to the gate of the transistor MD1-p. For the RC network 244-p, the input terminal 302 is coupled to the gate of the transistor MD1-p, and the output terminal 306 is coupled to the gate of the transistor MD2-p. When the transistor 310 is ON (i.e., the input terminal 302 and the output terminal 306 are electrically connected), the RC network 300 becomes inactive and thus incapable of generating a signal delay. The transistor 310 is optional and can be omitted in some embodiments. The time constant of the RC network 300 is the product of the resistance value of the resistor 320 and the capacitance value of the capacitor 330. In other words, the time constant of the RC network 300 can be altered by adjusting the resistance value of the resistor 320 and the capacitance value of the capacitor 330.

Reference is made to FIG. 2 again. There is a time delay between the first current Iec1-p and the second current Iec2-p due to the presence of the RC network 244-p. That is, the echo cancellation circuit 240-p draws the first current Iec1-p from the input path PI-p (i.e., cancelling a part of the echo) at the first time point and draws the second current Iec2-p from the input path PI-p (i.e., cancelling a part of the echo) at the second time point later than the first time point. The magnitudes of the first current Iec1-p and the second current Iec2-p, which are respectively controlled by the resistor RX1-p and the resistor RX2-p, may be different or the same. In other words, the echo cancellation circuit 240-p can cancel the echo Ioe-p using echo cancellation signals of same or different magnitude(s) at different time points. The time delay between the first current Iec1-p and the second current Iec2-p is dependent on the time constant of the RC network 244-p. The greater the time constant, the greater the time delay.

In some embodiments, the time constant of the RC network 242-p and the time constant of the RC network 244-p are independent of each other, that is, the two time constants may be the same or different.

Figure 4:
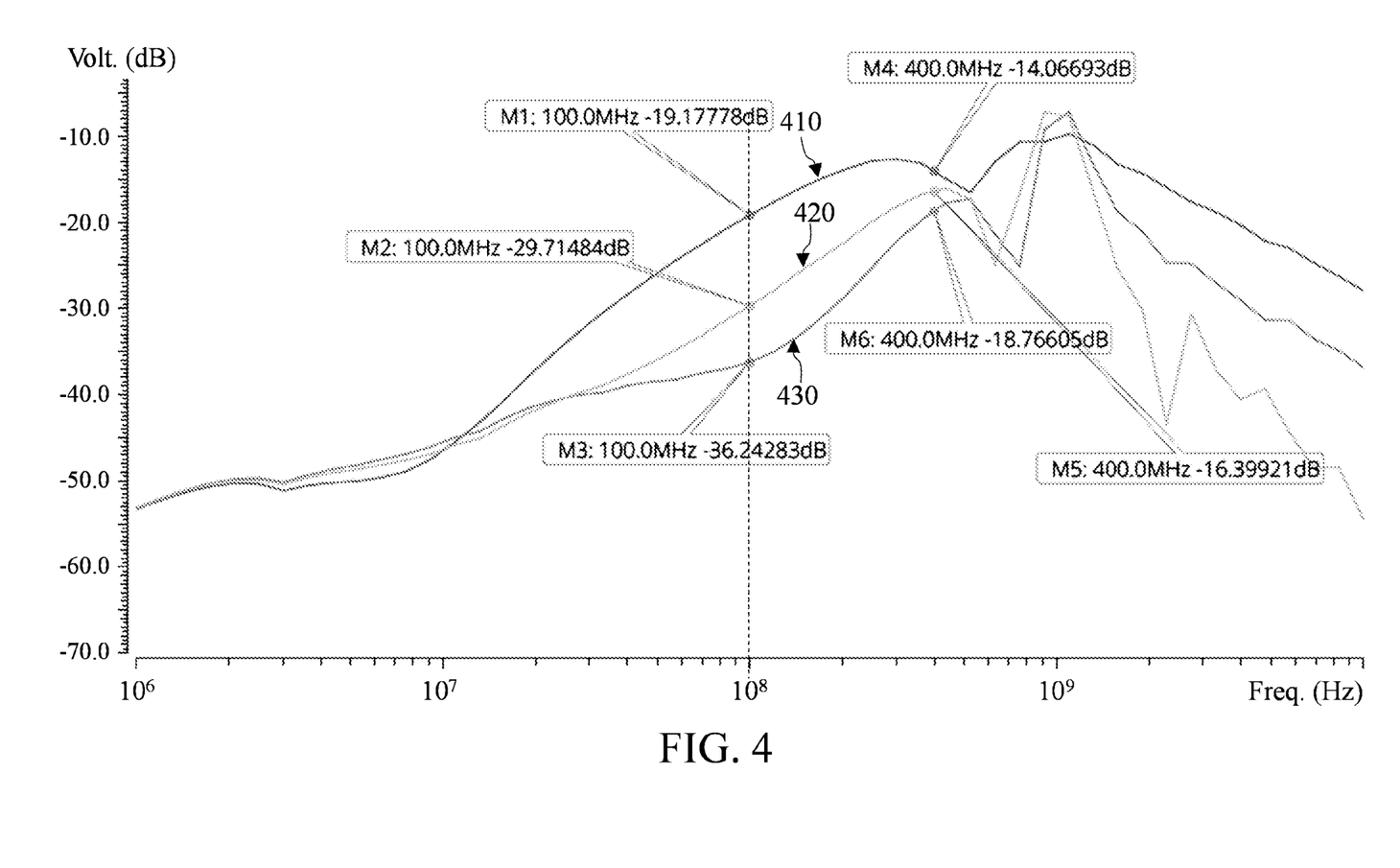
FIG. 4 is a simulation showing the effect of the echo cancellation circuit of the present invention.

FIG. 4 is a simulation showing the effect of the echo cancellation circuit of the present invention. The curve 410 corresponds to no echo cancellation circuit being implemented, the curve 420 corresponds to the echo cancellation circuit including only one current path, and the curve 430 corresponds to the echo cancellation circuit including at least two current paths (e.g., the echo cancellation circuit 240-p). It can be observed that at the operating frequency of 100 MHz, the echo cancellation circuit that includes only one current path can cancel the echo by about 10.5 dB, while the echo cancellation circuit 240-p can cancel the echo by about 17.1 dB. In other words, compared to using only one current path, using at least two current paths (i.e., distributed echo cancellation) to cancel the echo has an improvement of about (17.1−10.5)/10.5≈63%.

Reference is made to FIG. 2 again. The transistor MP1-p and the transistor MP2-p are used to protect the transistor MD1-p and the transistor MD2-p, respectively. In some embodiments, the transistor MP1-p and the transistor MP2-p can be omitted if the transistor MD1-p and the transistor MD2-p are not subject to high voltage. Although FIG. 2 shows only two current paths, in other embodiments, the echo cancellation circuit 240-p may include more current paths, and the RC networks on these current paths are connected in series. The main transistor refers to the transistor whose gate is electrically connected to a RC network, such as the transistor MD1-p and the transistor MD2-p.

Figure 5:
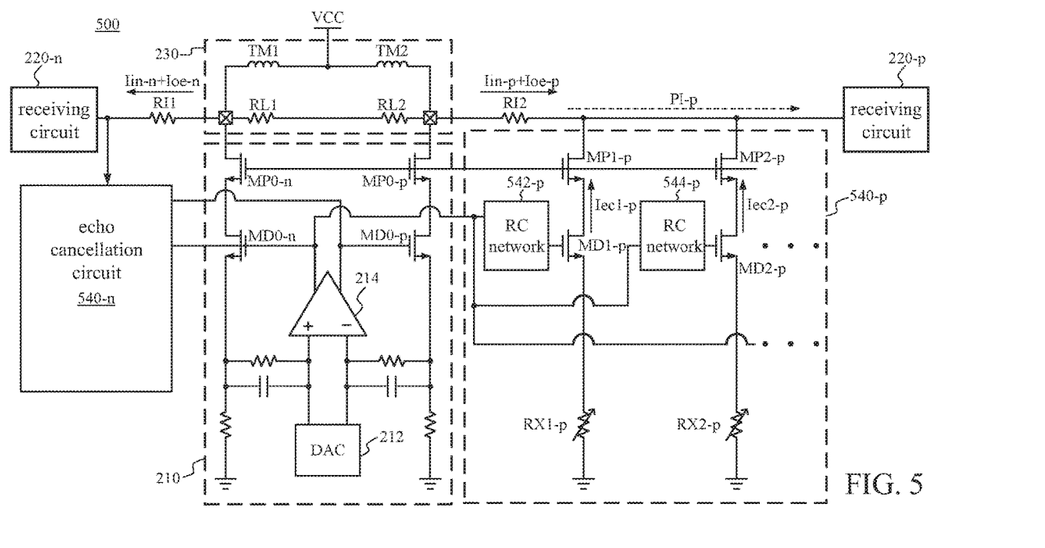
FIG. 5 is a circuit diagram of an illustrative echo cancellation circuit according to another embodiment of the present invention.

FIG. 5 is a circuit diagram of an illustrative echo cancellation circuit according to another embodiment of the present invention. The electronic device 500 in FIG. 5 is similar to the electronic device 200 in FIG. 2, except that the echo cancellation circuit 540 (which includes 540-p and 540-n) in FIG. 5 is a parallel design. Specifically, the RC network 542-p is coupled between the gate of the output transistor MD0-n and the gate of the transistor MD1-p, and the RC network 544-p is coupled between the gate of the output transistor MD0-n and the gate of the transistor MD2-p. In other words, the RC networks on the current paths of the echo cancellation circuit 540-p are connected in parallel.

The RC network 542-p has a first time constant, and the RC network 544-p has a second time constant. The time delay between the first current Iec1-p and the second current Iec2-p is related to the first time constant and the second time constant. When the first time constant is substantially the same as the second time constant, the time delay between the first current Iec1-p and the second current Iec2-p is substantially zero. People having ordinary skill in the art can control the echo cancellation circuit 540, by adjusting the first time constant, the second time constant, the resistance value of the resistor RX1-p and the resistance value of the resistor RX2-p, to cancel the echo Ioe-p using currents of same or different magnitude(s) at different time points. In some embodiments, the first time constant and the second time constant are independent of each other, that is, the first time constant and the second time constant may be the same or different. The simulation result of the circuit in FIG. 5 is similar to FIG. 4.

Figure 6:
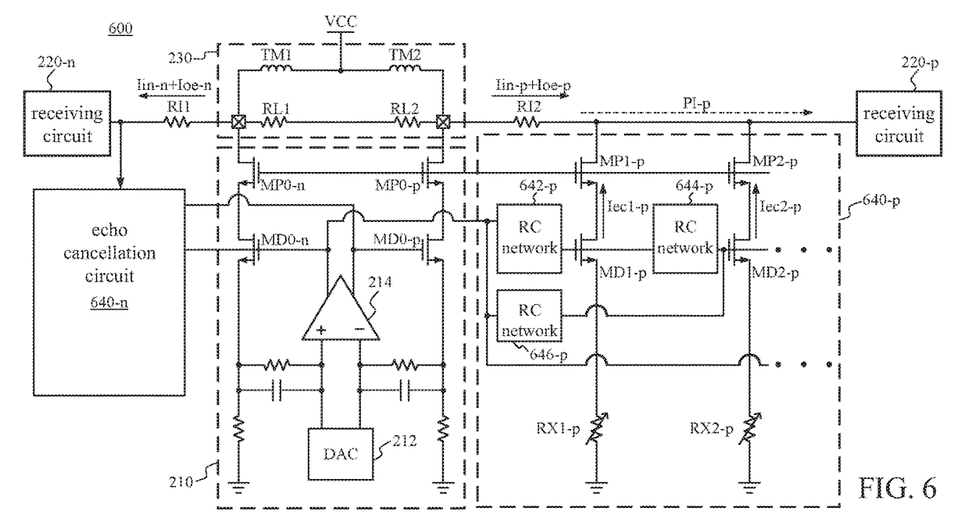
FIG. 6 is a circuit diagram of an illustrative echo cancellation circuit according to another embodiment of the present invention.

FIG. 6 is a circuit diagram of an illustrative echo cancellation circuit according to another embodiment of the present invention. The electronic device 600 in FIG. 6 is similar to the electronic devices 200 and 500, except that the echo cancellation circuit 640 (which includes 640-p and 640-n) in FIG. 6 includes parallel and series designs. Specifically, the RC network 642-p and the RC network 644-p are connected in series, and the RC network 642-p and the RC network 646-p are connected in parallel. In other words, the connections between the RC networks on the current paths of the echo cancellation circuit 640-p include series connection and parallel connection.

The RC network 642-p has a first time constant, the RC network 644-p has a second time constant, and the RC network 646-p has a third time constant. The time delay between the first current Iec1-p and the second current Iec2-p is dependent on the first time constant, the second time constant and the third time constant. People having ordinary skill in the art can control the echo cancellation circuit 640, by adjusting the first time constant, the second time constant, the third time constant, the resistance value of the resistor RX1-p and the resistance value of the resistor RX2-p, to cancel the echo Ioe-p using currents of same or different magnitude(s) at different time points. Compared to the echo cancellation circuit 240 and the echo cancellation circuit 540, the echo cancellation circuit 640 can cancel the echo in a more flexible manner due to the additional adjustable parameter (i.e., the time constant of the RC network 646-p). The simulation result of the circuit in FIG. 6 is similar to FIG. 4.

In some embodiments, the first time constant, the second time constant and the third time constant are independent of each other, that is, these three time constants may be the same or different.

The aforementioned RC networks 542-p, 544-p, 642-p, 644-p and 646-p can be implemented by the RC network 300 in FIG. 3.

This invention provides an echo cancellation circuit that can generate multiple echo cancellation signals, and their respective corresponding RC networks can be independently adjusted. With such a design, the echo cancellation circuit is easy to simulate the complex load of the circuit. As a result, the generated echo cancellation signals can better resemble the echo in the circuit since the echo is highly dependent on the load and the operating frequency of the circuit. Consequently, this invention has an excellent echo cancellation effect.

The shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An echo cancellation circuit, coupled to a transmitting circuit and a receiving circuit of an electronic device, the transmitting circuit comprising an output transistor, the echo cancellation circuit comprising:
   a first transistor, having a first gate, a first drain and a first source, wherein the first drain is coupled to the receiving circuit;
   a second transistor, having a second gate, a second drain and a second source, wherein the second drain is coupled to the receiving circuit;
   a first resistor-capacitor network (RC network), coupled between a gate of the output transistor and the first gate;
   a second RC network, coupled between the first gate and the second gate;
   a first resistor, having an end coupled to the first source and an other end coupled to a reference voltage; and
   a second resistor, having an end coupled to the second source and an other end coupled to the reference voltage.

2. The echo cancellation circuit of claim 1, wherein the first RC network has a first time constant, the second RC network has a second time constant, and the first time constant and the second time constant are independent of each other.

3. The echo cancellation circuit of claim 2, wherein the first time constant is different from the second time constant.

4. An echo cancellation circuit, coupled to a transmitting circuit and a receiving circuit of an electronic device, the transmitting circuit comprising an output transistor, the echo cancellation circuit comprising:
   a first transistor, having a first gate, a first drain and a first source, wherein the first drain is coupled to the receiving circuit;
   a second transistor, having a second gate, a second drain and a second source, wherein the second drain is coupled to the receiving circuit;
   a first resistor-capacitor network (RC network), coupled between a gate of the output transistor and the first gate;
   a second RC network, coupled between the gate of the output transistor and the second gate;
   a first resistor, having an end coupled to the first source and an other end coupled to a reference voltage; and
   a second resistor, having an end coupled to the second source and an other end coupled to the reference voltage.

5. The echo cancellation circuit of claim 4, wherein the first RC network has a first time constant, the second RC network has a second time constant, and the first time constant and the second time constant are independent of each other.

6. The echo cancellation circuit of claim 5, wherein the first time constant is different from the second time constant.

7. An echo cancellation circuit, coupled to a transmitting circuit and a receiving circuit of an electronic device, the transmitting circuit comprising an output transistor, the echo cancellation circuit comprising:
   a first transistor, having a first gate, a first drain and a first source, wherein the first drain is coupled to the receiving circuit;
   a second transistor, having a second gate, a second drain and a second source, wherein the second drain is coupled to the receiving circuit;
   a first resistor-capacitor network (RC network), coupled between a gate of the output transistor and the first gate;
   a second RC network, coupled between the first gate and the second gate;
   a third RC network, coupled between the gate of the output transistor and the second gate;
   a first resistor, having an end coupled to the first source and an other end coupled to a reference voltage; and
   a second resistor, having an end coupled to the second source and an other end coupled to the reference voltage.

8. The echo cancellation circuit of claim 7, wherein the first RC network has a first time constant, the second RC network has a second time constant, the third RC network has a third time constant, a first current flows through the first transistor, a second current flows through the second transistor, there is a time delay between the first current and the second current, and the time delay is dependent on the first time constant, the second time constant and the third time constant.

9. The echo cancellation circuit of claim 8, wherein the first time constant, the second time constant and the third time constant are independent of each other.

* * * * *